Sheet 1 - 4 Sheets

J. C. Jewell,
Making Wrought Nails,

N° 48,560. Patented July 4, 1865.

Witnesses.
Henry Morris
C. L. Topliff

Inventor:
John C. Jewell
per minus H. S.
Attorneys

J. C. Jewell,
Making Wrought Nails,
No. 48,560. Patented July 4, 1865.

Witnesses.
Henry Morris
C L Topliff

Inventor.
John C Jewell
per Munn & Co
Attorneys

J. C. Jewell,
Making Wrought Nails,
N° 48,560. Patented July 4, 1865.
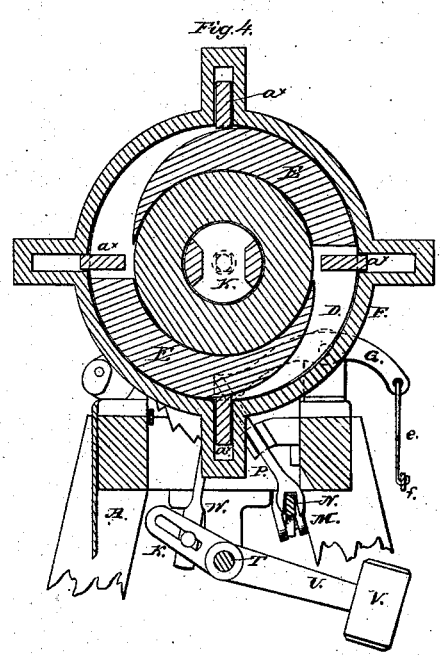
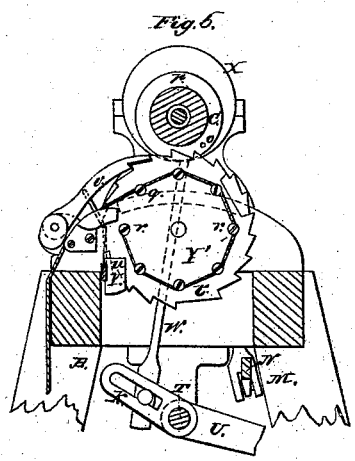

UNITED STATES PATENT OFFICE.

JOHN C. JEWELL, OF BOSTON, MASSACHUSETTS.

IMPROVED FORGING-MACHINE.

Specification forming part of Letters Patent No. 48,560, dated July 4, 1865.

*To all whom it may concern:*

Be it known that I, JOHN C. JEWELL, of Boston, in the county of Suffolk and State of Massachusetts, have invented a new and Improved Forging-Machine; and I do hereby declare that the following is a full, clear, and exact description thereof, which will enable others skilled in the art to make and use the same, reference being had to the accompanying drawings, forming part of this specification, in which—

Figure 1:
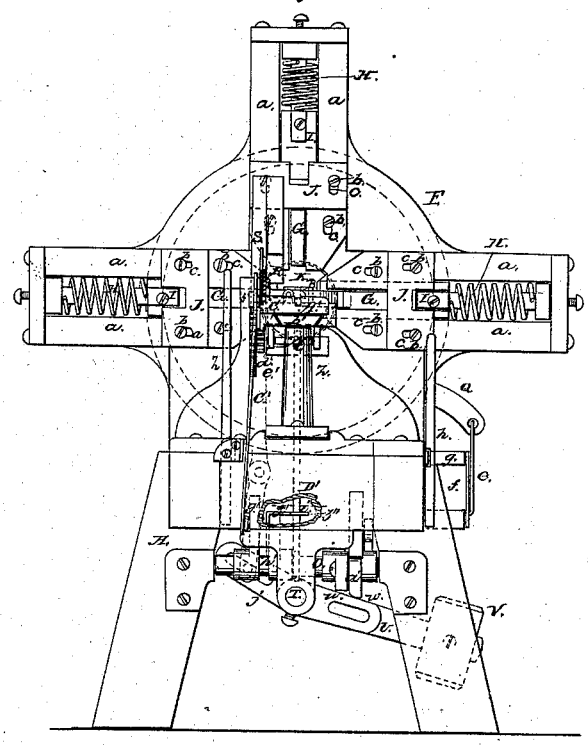
Figure 2:
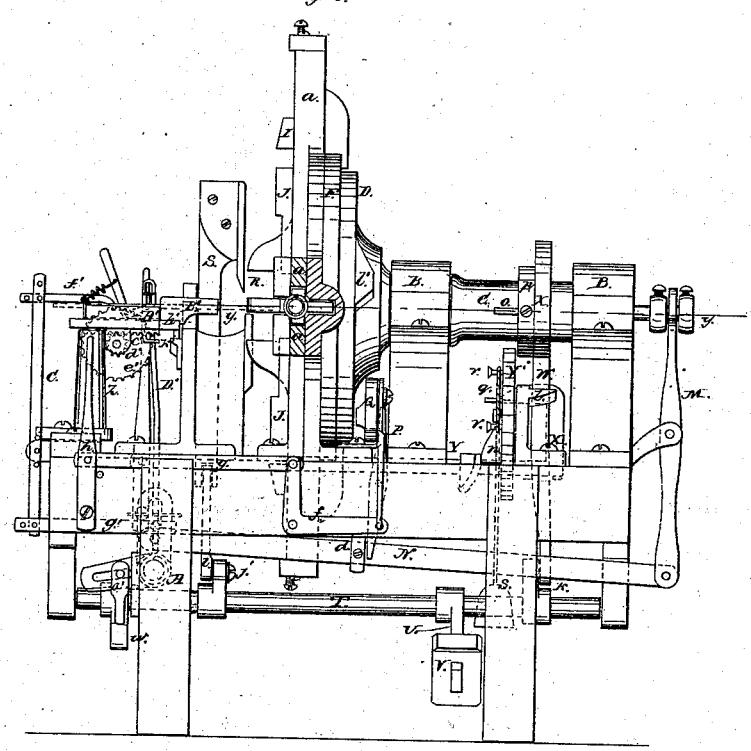
Figure 3:
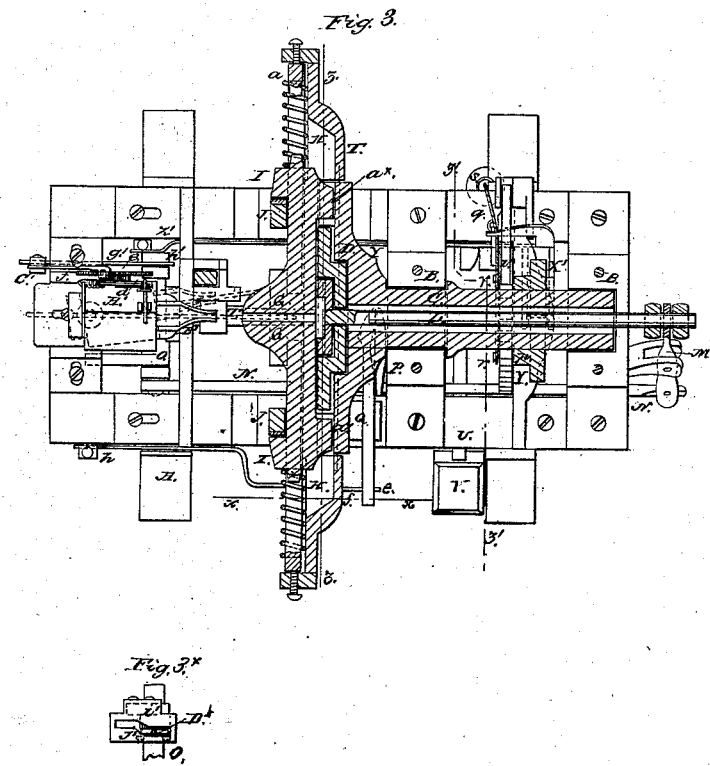

Figure 1, Sheet No. 1, is a front elevation of my invention; Fig. 2, Sheet No. 2, a side elevation of the same, partly in section, as indicated by the line $x\ x$, Fig. 3; Fig. 3, Sheet No. 3, a horizontal section of the same, taken in the line $y\ y$, Fig. 2; Fig. $3^{\times}$, Sheet No. 3, a section of a portion of the same, taken in the line $z''\ z''$, Fig. 1; Fig. 4, Sheet No. 4, a transverse vertical section of the same, taken in the line $z\ z$, Fig. 3; Fig. 5, Sheet No. 4, a transverse vertical section of the same, taken in the line $z'\ z'$, Fig. 3.

Similar letters of reference indicate like parts.

This invention relates to a new and improved machine for forging various articles, such as nails, file-shanks, spindles, &c.

The invention consists in the employment or use of two pairs of hammers arranged and operated so as to approach and recede from each other alternately in pairs, and using, in connection therewith, a stop mechanism, feeding and cutting device, and certain other parts, herein shown and described, whereby a simple and automatically-working device is obtained for the purpose specified.

A represents a framing, which is constructed in a substantial manner to support the working parts of the device, and B B are two heads secured on said framing, in which a horizontal arbor, C, is fitted and allowed to rotate freely. On one end of this arbor C there is a circular disk, D, to the face side of which two cam-projections, E E, are attached, the shape of which is shown clearly in Fig. 4, and this disk is fitted and allowed to rotate freely in a circular shell, F, which is firmly secured in a vertical position on the framing A. To this shell F there are attached four pairs of guides, $a$, said guides having a radial position relatively with the shell. Between each pair of guides there is placed a hammer, G, which is placed so as to be thrown inward toward the center of the shell F by spiral springs H, the extent of this inward movement being determined by stops I on the hammers, which come in contact with adjustable bars J on the guides, said bars being attached to the guides by set-screws $b$, which pass through oblong slots $c$ in the bars and into the guides. (See Fig. 1.) The hammers G, it will be seen by referring to Fig. 1, are arranged in pairs, the hammers of each pair working in line with each other, and being thrown or moved outward from each other by the cam-projections E E, the two pairs of hammers moving alternately toward and from each other. The length of the stroke of the hammers may be regulated as desired by adjusting the bars J. The hammers may be rendered inoperative at any time by means of a stop, K, which is a circular head on the end of a rod, L, fitted in the arbor C, the rod being allowed to slide freely in the arbor, and the head to slide in a circular opening in the center of the shell, so as to bear against the faces of the hammers and keep the latter distended. This stop may be drawn out to free the hammers at any time at the will of the attendant by the following mechanism: The back end of the rod L is connected to a lever, M, the lower end of which is attached to a bar, N, extending along under the machine to its front end, and connected to a rock-shaft, O, the function of which will be hereinafter described. This bar N has a button, $d$, upon it, which is near a lever, P, attached to the framing A.

Q is a lever on the upper part of the framing, the inner part of lever Q being near the upper end of lever P, and the outer end of lever Q is connected by a rod, $e$, with a bent lever, $f$, which is connected by a bar, $g$, with a lever, $h$, at the front of the framing A. By actuating the lever $h$ the inner end of lever Q will strike the upper end of lever P, and the lower end of the latter will strike the button $d$ on bar N, and the latter actuate the lever M, so as to draw back the stop K. This arrangement admits of the hammer being started at a particular place.

The operation of the hammers will be clearly understood. As the arbor C is rotated the cam-projections E E act upon the projections $a^{\times}$ at the rear sides of the hammers and force the same outward, each pair alternately, the springs H forcing the hammers inward or toward each other as the cam-projections E pass the projections $a^x$.

R represents a knife or cutter, which is attached to a vertical slide, S, on the framing A, the lower end of the slide being connected by a link, $i$, with an arm, $j$, on a shaft, T, underneath the machine, said shaft having an arm, U, projecting from it, with a weight, V, on its outer end. (See Figs. 1 and 4.) The rear end of the shaft T has an arm, $k$, projecting from it, to which an upright bar, W, is attached, said bar extending up through a notch or guide, $l$, on the framing, and having its upper end underneath a cam, X, on the arbor C. The knife or cutter is actuated so as to cut off the forged articles in consequence of the cam X forcing down the bar W, and the latter actuating the shaft T so that the arm $j$ will draw down the knife upon the work, the latter resting on a bar, $m$, attached to the framing. (See Fig. 2.) The bar W is fitted in a fork, X', which is attached to a sliding bar, Y, at one side of the machine, said bar being connected at its front end to a lever, Z'. By moving this bar Y the fork X' may be made to throw the bar W underneath or out from the cam X, so that the knife R may be actuated when desired. This arrangement, however, is designed principally for throwing the bar W from underneath the cam X, an automatic arrangement being employed for throwing said bar underneath the cam, which is composed of the following parts:

A ratchet, Y', is fitted in the framing A, underneath the arbor C, said ratchet having an inclined or beveled projection, $n$, on one side. (See Fig. 5.) This ratchet Y' is rotated the distance of one tooth at each revolution of the arbor C by means of a pin, $o$, which projects from a hub, $p$, of the cam X, and engages with the teeth of the ratchet, and a cord, $q$, is attached to the ratchet and works over pins $r$ projecting therefrom, and has a weight, $s$, attached to it. The ratchet is provided with one large tooth, $t$, which allows the pin $o$ to escape when said tooth comes underneath the hub $p$, and just previous to the arrival of the tooth $t$ at this point the beveled projection $n$ strikes a button, $u$, on bar Y, and moves the bar Y and thereby throws the bar W underneath the cam X, and as the bar Y moves the fork X throws the holding-pawl $v$ out from the ratchet Y', and the latter is drawn back under the action of the weight $s$.

The front end of the shaft T has an arm, $u$, projecting from it, which extends underneath an arm, $a'$, on the rock-shaft O, and turns or moves the latter each time the bar W is forced down by the cam X, and the rod L is thereby moved through the medium of the lever M, and the stop K shoved forward in the opening at the center of shell F, so as to keep the hammers G out from each other in a distended state, and thereby render them inoperative.

The forging and cutting operations being now described, I will proceed to explain the feeding mechanism and the means whereby the forged end of the bar is presented to the knife or cutter R.

On the front end of the framing A there is an upright, Z, on which a horizontal bed, A', is fitted on a tenon and allowed to turn freely. This bed A' is provided with a sliding trough, B', in which the bar (shown in red) to be forged is placed. The trough B' is attached to a slide, $b'$, fitted in a groove in the under side of the bed A', and having a rack, $c'$, attached to it, in which a pinion, $d'$, gears, said pinion being on the shaft of a ratchet, $e'$, into which a pawl, $f'$, catches, the latter being at the upper end of a lever, C', the lower end of which is connected to an arm, $h'$, on the rock-shaft O by a link, $g'$.

To the arm $h'$ there is attached a plate, $i'$, having an oblique slot, $j'$, made in it, through which a rod, D', passes, the lower end of the latter being fitted loosely on the rock-shaft O, and the upper end fitted in a socket, $k'$, at the under side of the bed A'. This rod D' turns the bed, so as to bring the forged end of the rod underneath the cutter R just after the hammers cease their work and just before the cutter descends, and after the latter has cut off the forged end of the rod and the bed is moved back in proper position relatively with the hammers the ratchet $e'$ is moved by the pawl $f'$ of lever C' and the rod is fed forward a proper distance to be again acted upon by the hammers. The weight V of arm U brings the shaft T back to its original position each time after being operated, as described.

The number of blows required to be given at each forging may be regulated by the ratchet Y'.

At the commencement of each operation an inclined or beveled projection, $l'$, at the back of the disk D, strikes the inner end of lever Q, and thereby shoves the stop K back from the hammers G.

The device, it will be seen, operates automatically throughout, and but little labor is required in attending the machine.

Having thus described my invention, I claim as new and desire to secure by Letters Patent—

1. The stop K, when arranged, in connection with the hammers G, to operate in the manner substantially as and for the purpose herein set forth.

2. The knife or cutter R, when arranged so as to be operated from the shaft T, substantially as described.

3. The ratchet Y', provided with the beveled projections $n$, and used in connection with the pin $o$ on the hub $p$ of arbor C, in combination with the sliding bar Y, provided with the button $u$ and fork X', the pawl $v$, the bar W, connected with shaft T, and the cam X on arbor C, all arranged substantially as shown, for the purpose specified.

4. The horizontal movable or turning bed A', with sliding trough B' attached, operated from the rock-shaft O through the medium of the obliquely-slotted plate $i'$, and rod $D'$, arranged substantially as and for the purpose set forth.

5. The manner of operating the trough $B'$ for feeding the rod to the hammers—to wit, by means of the rack $c'$, attached to the slide $b'$, the pinion $d'$, gearing into rack $c'$, and the ratchet $e'$, into which a pawl, $f'$, attached to lever $C'$, catches, the lever $C'$ being actuated from the rock-shaft O, and all arranged substantially as described.

JOHN C. JEWELL.

Witnesses:
 GEO. R. ROWE,
 L. F. SMITH.